United States Patent
Goodzeit et al.

(10) Patent No.: US 7,917,256 B2
(45) Date of Patent: *Mar. 29, 2011

(54) ACTIVE VIBRATION DAMPING (AVD) SYSTEM FOR PRECISION POINTING SPACECRAFT

(75) Inventors: Neil E. Goodzeit, Princeton, NJ (US); Harald J. Weigl, Doylestown, PA (US)

(73) Assignee: Lockheed Martin Corporation, Bethesda, MD (US)

( * ) Notice: Subject to any disclaimer, the term of this patent is extended or adjusted under 35 U.S.C. 154(b) by 955 days.

This patent is subject to a terminal disclaimer.

(21) Appl. No.: 11/797,251

(22) Filed: May 2, 2007

(65) Prior Publication Data

US 2008/0272240 A1    Nov. 6, 2008

(51) Int. Cl.
*B64G 1/38* (2006.01)
(52) U.S. Cl. ............. 701/13; 244/158.1; 244/172.7
(58) Field of Classification Search ............. 244/158.1, 244/172, 7; 701/13
See application file for complete search history.

(56) References Cited

U.S. PATENT DOCUMENTS

| | | | |
|---|---|---|---|
| 4,892,273 A | 1/1990 | Fedor | |
| 6,600,976 B1 | 7/2003 | Goodzeit et al. | |
| 2004/0135035 A1* | 7/2004 | Peck | 244/165 |
| 2006/0119026 A1 | 6/2006 | Ryaboy et al. | |
| 2007/0032890 A1* | 2/2007 | Zhou et al. | 700/63 |
| 2007/0068756 A1* | 3/2007 | Huston et al. | 188/378 |

* cited by examiner

*Primary Examiner* — Khoi Tran
*Assistant Examiner* — Rodney King
(74) *Attorney, Agent, or Firm* — McDermott Will & Emery LLP

(57) ABSTRACT

An active vibration damping (AVD) control system for spacecraft provides a simple-to-implement and robust formulation that provides a novel damping control method for reducing spacecraft structural vibrations and improving antenna and instrument pointing. The AVD control system comprises an excitation signal generator configured to generate excitation input signals, and a damping model identification unit configured to receive system identification data and configured to produce control model parameters, the system identification data comprising the excitation input signals and information associated with motion of the spacecraft. The AVD control system further comprises an AVD control unit configured to receive the control model parameters, the AVD control unit configured to produce AVD control signals to control one or more actuators of the spacecraft.

15 Claims, 4 Drawing Sheets

ACTIVE VIBRATION DAMPING (AVD) SYSTEM FOR PRECISION POINTING SPACECRAFT

STATEMENT AS TO RIGHTS TO INVENTIONS MADE UNDER FEDERALLY SPONSORED RESEARCH OR DEVELOPMENT

Not Applicable.

FIELD OF THE INVENTION

The present invention generally relates to control systems and vibration damping and, in particular, relates to active vibration damping systems for spacecraft.

BACKGROUND OF THE INVENTION

Today's communications and remote sensing spacecraft include large flexible appendages such as solar arrays and antennas that vibrate when excited by thruster or instrument disturbance torques. These vibrations may result in out-of-tolerance antenna or instrument pointing errors.

Maintaining precision payload pointing with large flexible structures poses a significant challenge for spacecraft attitude control systems, since the motion of the appendages can adversely impact payload pointing performance. The increased size of the flexible appendages results in lower flexible mode frequencies that impact the bandwidth and stability robustness of attitude control systems. Low-bandwidth controllers that are designed to avoid interaction between the attitude control system and the spacecraft flexible dynamics may have insufficient performance to meet payload pointing requirements. In addition, low-bandwidth control schemes may not meet pointing requirements in the presence of disturbances that excite flexible structure vibrations. These disturbances include those induced by thruster firing during stationkeeping and momentum unloading maneuvers as well the payload scanning mirror on a remote sensing instrument. Advanced control methods are needed to increase the damping of flexible structural modes for payload pointing requirements that must be met in the presence of such disturbances.

Certain flexible spacecraft structure control systems rely on accurate a-priori models of the flexible spacecraft dynamics and involve ground-based controller design that can be time-consuming and expensive. Robustness is generally an issue due to the need to develop highly accurate models of all system elements between the applied control input and the measured system output. Designing robust control systems, which provide the required attenuation of flexible structure motion in the presence of model uncertainties, is thus a challenging and time consuming process. In addition, these systems require extensive redesign whenever the spacecraft dynamic models change.

SUMMARY OF THE INVENTION

An active vibration damping (AVD) control system according to the present invention address these issues by basing the active damping control design on an in-orbit identified spacecraft dynamics model, instead of an a-priori model. This approach is inherently robust since it directly identifies the on-orbit dynamics of all elements from the excitation input signals to the measured output such as the dynamics of the spacecraft, sensors, actuators, low-bandwidth attitude control, and time delays. These same inputs and outputs are then used to implement the active vibration damping control system. According to one aspect of the present invention, a simple and robust control method damps the dominant flexible modes.

The present invention thus provides a simple-to-implement and robust formulation that provides a damping control method for reducing spacecraft structural vibrations and improving antenna and instrument pointing. This approach does not rely on a-priori models or ground-based controller design, as is the case with other approaches. According to one aspect of the present invention, the damping control is determined on-board the spacecraft based solely on an in-orbit identified dynamics model of the spacecraft.

According to one embodiment of the present invention, an active vibration damping (AVD) control system for spacecraft comprises an excitation signal generator configured to generate excitation input signals, and a damping model identification unit configured to receive system identification data and configured to produce control model parameters, the system identification data comprising the excitation input signals and information associated with motion of the spacecraft. The AVD control system further comprises an AVD control unit configured to receive the control model parameters, the AVD control unit configured to produce AVD control signals to control one or more actuators of the spacecraft.

According to one aspect of the present invention, a method is provided for actively damping vibration generated on a spacecraft. The method comprises: generating an excitation input signal; applying a force based on the excitation input signal to the spacecraft; receiving system identification data comprising the excitation input signal and first information associated with motion of the spacecraft; generating control model parameters based on the system identification data; obtaining second information associated with motion of the spacecraft; generating a damping signal based on the control model parameters and the second information; generating a damping force based on the damping signal; and applying the damping force to the spacecraft to damp vibration.

According to one exemplary embodiment of the present invention, the damping model identification unit is a dynamic model identification unit, and the control model parameters are represented as periodic model parameters or Fourier model coefficients.

Additional features and advantages of the invention will be set forth in the description below, and in part will be apparent from the description, or may be learned by practice of the invention. The objectives and other advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide further understanding of the invention and are incorporated in and constitute a part of this specification, illustrate embodiments of the invention and together with the description serve to explain the principles of the invention.

DETAILED DESCRIPTION OF THE INVENTION

In the following detailed description, numerous specific details are set forth to provide a full understanding of the present invention. It will be obvious, however, to one ordinarily skilled in the art that the present invention may be practiced without some of these specific details. In other instances, well-known structures and techniques have not been shown in detail so as not to obscure the present invention.

AVD Control System Overview

According to one aspect of the present invention, the spacecraft dynamics are identified while the spacecraft is not in operation, for example, once during the spacecraft pre-operational in-orbit testing period and/or other times while the spacecraft is off-line. One embodiment presented herein considers periodic, time-varying spacecraft dynamics due to solar array rotation. To account for the dependence of the spacecraft dynamics on the solar array angle, the system dynamics are identified over a large range of array angles (typically 180°). In one embodiment of the present invention, the spacecraft dynamics are excited by a known set of excitation input signals during the identification (ID) testing. The response of the spacecraft to these input signals is measured by an inertial measurement unit (IMU), and the response is converted to body rates. The excitation input signals and body rates can be processed in real-time on the spacecraft or post-processed on the ground to identify the spacecraft dynamics as a function of the solar array angle.

Identifying the spacecraft on-orbit dynamics eliminates the dependence of the controller performance on the accuracy of pre-flight system dynamic models since the dynamics of the spacecraft, sensors, actuators, and control processing are measured directly. Once the spacecraft dynamics have been identified and the performance and robustness of the identification-based vibration controller has been verified, control model parameters (e.g., periodic model parameters or Fourier model coefficients) are stored on-board the spacecraft. The control model parameters are used on-board to compute the active vibration damping (AVD) control signals.

The spacecraft dynamics, which are periodic with respect to the solar array angle, are approximated on-board as control model parameters, and the control model parameters are generated once the system identification has been completed. The AVD control function is updated on-board using the periodic dynamic model as the solar array angle changes to track the Sun. The inputs to the damping controller include body rates, and the outputs include AVD control torque commands.

Figure 1:
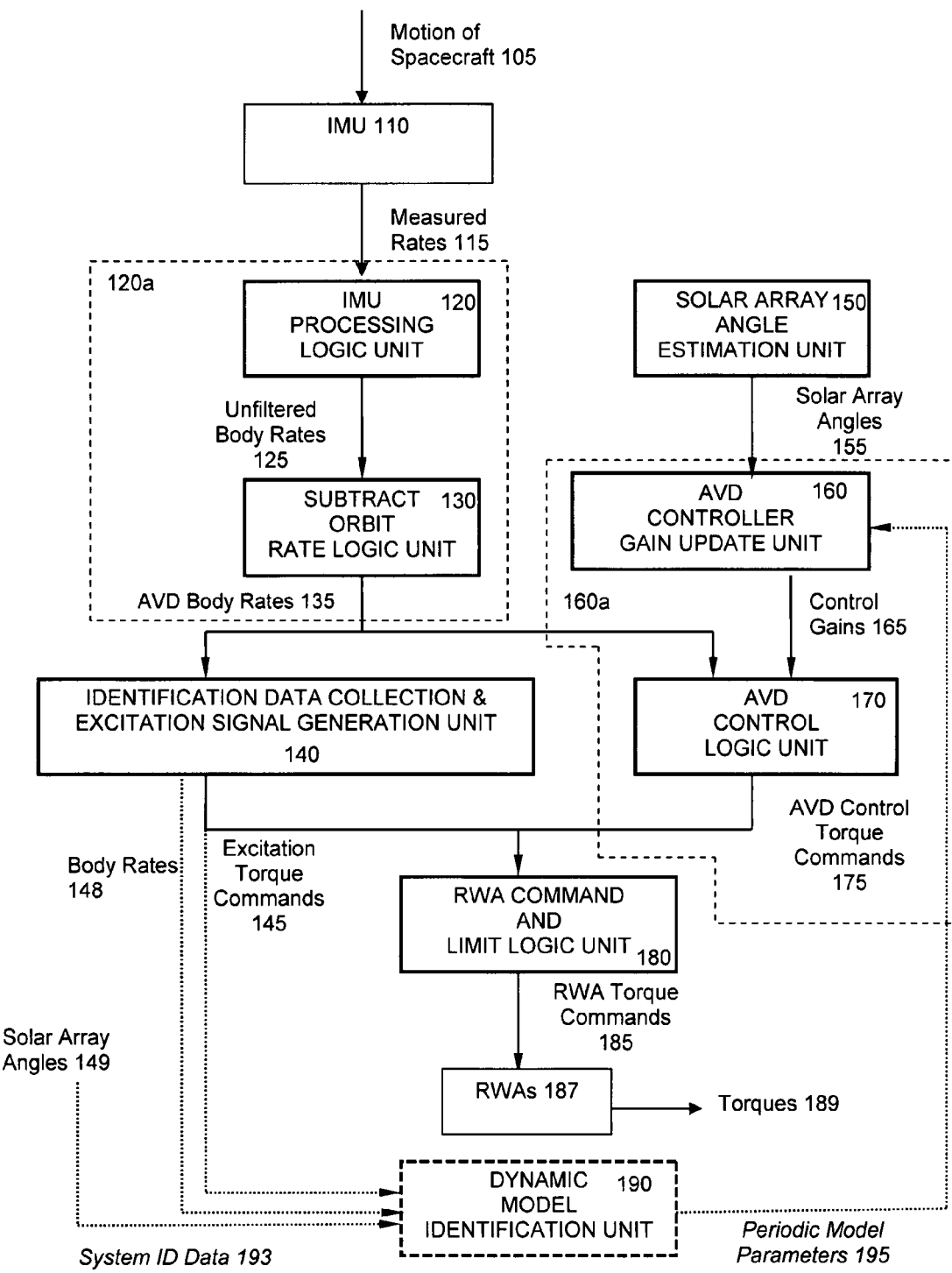
FIG. 1 illustrates a block diagram of an active vibration damping (AVD) control system according to one embodiment of the present invention.

FIG. 1 illustrates a block diagram of an AVD control system according to one embodiment of the present invention. The AVD control system 100 includes a sensor such as an IMU 110, a sensor computation unit 120a, an identification data collection and excitation signal generation unit 140, a solar array angle estimation unit 150, an AVD control unit 160a, an actuator control unit such as an Reaction Wheel Assembly (RWA) command and limit logic unit 180, actuators such as RWAs 187, and a damping model identification unit such as a dynamic model identification unit 190.

According to one embodiment, the sensor computation unit 120a includes an IMU processing logic unit 120 and a subtract orbit rate logic unit 130. The AVD control unit 160a includes an AVD controller gain update unit 160 and an AVD control logic unit 170. According to another embodiment, the AVD control unit 160a may further include the RWA command and limit logic unit 180. In yet another embodiment, the AVD control unit 160a may further include the RWAs 187. The identification data collection and excitation signal generation unit 140 includes an identification data collection unit and an excitation signal generation unit. According to one embodiment, the excitation signal generation unit includes a random number generator.

According to one embodiment, all of the components shown in FIG. 1 (i.e., units 110, 120a, 140, 150, 160a, 180, 187 and 190) are on-board a spacecraft. In an alternative embodiment, all of the components except the dynamic model identification unit 190 are on-board the spacecraft, and the dynamic model identification unit 190 is located on a ground station on the Earth. These locations are exemplary, and the locations of these components are not limited to these.

According to one aspect of the present invention, the spacecraft dynamics are identified and processed as follows. The excitation signal generation unit of the identification data collection and excitation signal generation unit 140 generates excitation input signals such as excitation torque commands 145, which may be a pseudo random sequence or other types of signals, to excite the spacecraft dynamics over a wide frequency range of interest to be controlled. The excitation input signals are applied to the RWAs 187 through the RWA command and limit logic unit 180, which produces RWA torque commands 185. In response to the RWA torque commands 185, the RWAs 187 produces torques 189.

The IMU 110 detects and receives information regarding motions of the spacecraft 105 (e.g., information related to pitch, roll and yaw) as a result of the torques 189 applied to the spacecraft. The IMU 110 produces measured rates 115 (e.g., gyroscope rate outputs). The sensor computation unit 120a performs computation on the measured rates and converts these measured rates into another form. For example, the IMU processing logic unit 120 converts the measured rates 115 into unfiltered body rates 125. The subtract orbit rate logic unit 130 converts the unfiltered body rates 125 into AVD body rates 135 by subtracting the orbit rate from the unfiltered body rates 125. The AVD body rates 135 are used for system identification by the dynamic model identification unit 190 and for damping control by the AVD control logic unit 170. The identification data collection unit of the identification data collection and excitation signal generation unit 140 collects the AVD body rates 135 and supplies the collected body rates 148 to the dynamic model identification unit 190.

The system identification data 193 supplied to the dynamic model identification unit 190 includes not only the body rates 148 but also the excitation input signals such as the excitation torque commands 145 and solar array angles 149. The solar array angles 149 may be obtained from the solar array angle estimation unit 150 or from any other source that can generate solar array angles. If the dynamic model identification unit 190 is located on the ground, then the system identification data 193 is telemetered to the ground for analysis. The system identification data 193 is obtained for the spacecraft axes (yaw, roll and pitch axes) either one axis at a time or all at once. In another embodiment, the system identification data 193 may include information in addition to, or in alternative to, some or all of the following: body rates, excitation input signals and solar array angles.

The dynamic model identification unit 190 processes the system identification data 193 and produces control model parameters such as periodic model parameters 195 (e.g., a Fourier series representation) of the spacecraft dynamics that captures the periodicity of the dynamics with respect to the solar array angle. The periodic model parameters 195 from the dynamic model identification unit 190 are then provided (or uplinked, if the dynamic model identification unit 190 is located on the ground) to the AVD controller gain update unit 160 on-board the spacecraft. The periodic model parameters 195 are used to update the AVD control function as the solar array angle changes to track the sun. According to one aspect of the present invention, some or all of the steps of identifying and processing the spacecraft dynamics described above are performed while the spacecraft is not in operation.

The AVD controller gain update unit 160 receives a solar array angle(s) 155 and the periodic model parameters 195 and provides control gains 165 to the AVD control logic unit 170. Once valid periodic model parameters 195 have been placed into the AVD controller gain update unit 160 and AVD control computation has been enabled, the AVD control torque commands 175 are continuously calculated based on the body rates and the current solar array angle. If enabled, the AVD control torque commands 175 are output to the RWA command and limit logic unit 180.

The foregoing exemplary embodiment has been illustrated with a number of functional blocks (e.g., 120, 130, 140, 150, 160, 170, 180, 190). As will be apparent to one of skill in the art, these functions may be implemented in a single hardware component, multiple hardware components, software, firmware, or some combination thereof.

System Identification Processing

The ground or on-board processing of the system identification data is described in detail according to one embodiment of the present invention. For this embodiment, the dynamics for each spacecraft axis are identified and controlled as separate single-input, single-output (SISO) systems. For applications where the dynamics are strongly coupled between axes, the approach may be extended by those skilled in the art to identify and control multi-input, multi-output dynamics.

The excitation torque commands 145, the corresponding body rates 148, and the solar array angles 149 are telemetered to the ground while the spacecraft is not in operation (e.g., during pre-operational testing of the spacecraft) or processed on-board in real-time. This data is processed by the dynamic model identification unit 190 to estimate the SISO transfer function from the excitation torque commands 145 to the body rates 135 for each spacecraft axis. The input data is collected at intervals over a complete solar array rotation (360°) in order to capture the variation in spacecraft dynamics with solar array angle. This range may be restricted to 180° if the spacecraft dynamics is known to be periodic at twice the solar array rotation angle.

The dependence of the spacecraft dynamics on the solar array angle is approximated with control model parameters (e.g., Fourier model coefficients). The control model parameters are identified directly from the system identification data as described below. The control model parameters are subsequently stored on the spacecraft (e.g., within the AVD controller gain update unit 160) and used to update the AVD control function as the solar array angle changes.

Figure 2:
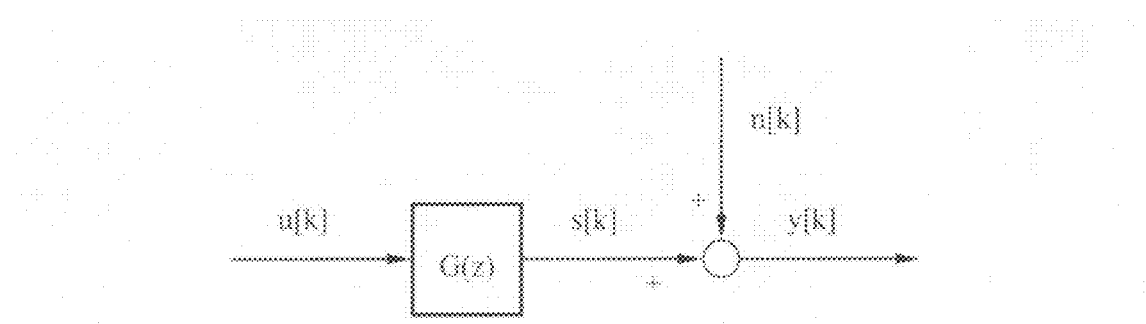
FIG. 2 illustrates the framework of the system identification for each spacecraft axis according to one embodiment of the present invention.

FIG. 2 illustrates the framework of the system identification for each spacecraft axis according to one embodiment of the present invention. The excitation torque commands 145 (e.g., a discrete-time sequence) are represented by u[k]. The true output signal from the plant, s[k], is assumed to be corrupted by random noise, n[k], resulting in an output, y[k], corresponding to the AVD body rates 135. It should be noted that the discrete-time plant transfer function, G(z), includes all of the dynamics from the excitation input signals to the measured output (such as the dynamics of the spacecraft, sensors, actuators, proportional-integral-derivative (PID) control, and time delays). The only constraint within this general framework is that the excitation input signals must be uncorrelated with the measurement noise; this constraint is met by the AVD control system since the excitation input signals for system identification are computed by an on-board random number generator according to one embodiment. In another embodiment, the excitation input signals may be generated by a source other than a random number generator.

The pth order discrete-time plant transfer function is assumed to have the following form (in the absence of noise) according to one aspect of the present invention:

$$G(z) = \frac{Y(z)}{U(z)} = \frac{b_1 z^{-1} + b_2 z^{-2} + \ldots + b_p z^{-p}}{1 - a_1 z^{-1} - a_2 z^{-2} - \ldots - a_p z^{-p}} \quad (1)$$

This is equivalent to the following pth order ARX (autoregressive with exogenous input) time-domain model structure according to one aspect of the present invention:

$$y[k] = a_1 y[k-1] + a_2 y[k-2] + \ldots + a_p y[k-p] + b_1 u[k-1] + b_2 u[k-2] + \ldots + b_p u[k-p] \quad (2)$$

The approach for identifying the parameters of an ARX model is extended in order to capture the dependence of the spacecraft dynamics with respect to the solar array angle, $\Theta$. According to one aspect of the present invention, it is assumed that the dominant spacecraft dynamics are periodic with respect to two and four times the solar array angle. Each coefficient of the periodic ARX model is therefore expressed as a second-order Fourier series of the following form according to one aspect of the present invention:

$$\begin{aligned}y[k] = &(A_{10} + A_{11}\sin(2\theta_k) + A_{12}\cos(2\theta_k) + A_{13}\sin(4\theta_k) + \\ &A_{14}\cos(4\theta_k))y[k-1] + (A_{20} + A_{21}\sin(2\theta_k) + A_{22}\cos(2\theta_k) + \\ &A_{23}\sin(4\theta_k) + A_{24}\cos(4\theta_k))y[k-2] + \ldots + (A_{p0} + A_{p1}\sin(2\theta_k) + \\ &A_{p2}\cos(2\theta_k) + A_{p3}\sin(4\theta_k) + A_{p4}\cos(4\theta_k))y[k-p] + \\ &(B_{10} + B_{11}\sin(2\theta_k) + B_{12}\cos(2\theta_k) + B_{13}\sin(4\theta_k) \\ &+ B_{14}\cos(4\theta_k))u[k-1] + (B_{20} + B_{21}\sin(2\theta_k) + B_{22}\cos(2\theta_k) + \\ &B_{23}\sin(4\theta_k) + B_{24}\cos(4\theta_k))u[k-2] + \ldots + (B_{p0} + B_{p1}\sin(2\theta_k) + \\ &B_{p2}\cos(2\theta_k) + B_{p3}\sin(4\theta_k) + B_{p4}\cos(4\theta_k))u[k-p]\end{aligned} \quad (3)$$

According to another embodiment of the present invention, the spacecraft dynamics are periodic with solar array angle, and the Fourier model coefficients include a constant and sine and cosine terms at the solar array angle, twice the solar array angle, three times the solar array angle, and four times the solar array angle. In this case, there will be ten Fourier model coefficients associated with each input and output delay state.

Also, additional Fourier terms may be added to the model, beyond the four described, if necessary to obtain better model accuracy.

This compact periodic model reduces the number of parameters required to represent the pth order time varying spacecraft dynamics. Once the Fourier model coefficients have been identified, the spacecraft dynamics (and the corresponding AVD control function) are computed for any solar array angle based on Equation 3.

In order to identify the model coefficients (Aij and Bij), the input/output data is collected over a wide range of solar array angles and collected in the following matrix form according to one aspect of the present invention:

$$\vec{Y} = \begin{bmatrix} \vdots \\ y[i] \\ \vdots \end{bmatrix} = \vec{\Phi}\vec{\Theta} = \begin{bmatrix} & & & & & \vdots & & & & & \\ y[i-1] & s2\theta_i y[i-1] & c2\theta_i y[i-1] & s4\theta_i y[i-1] & c4\theta_i y[i-1] & \ldots & u[i-p] & s2\theta_i u[i-p] & c2\theta_i u[i-p] & s4\theta_i u[i-p] & c4\theta_i u[i-p] \\ & & & & & \vdots & & & & & \end{bmatrix} \begin{bmatrix} A_{10} \\ A_{11} \\ A_{12} \\ A_{13} \\ A_{14} \\ \vdots \\ B_{p0} \\ B_{p1} \\ B_{p2} \\ B_{p3} \\ B_{p4} \end{bmatrix}$$

(4)

where $s\Theta$ and $c\Theta$ are shorthand for $\sin(\Theta)$ and $\cos(\Theta)$.

The time indices of the elements in the vector $\vec{Y}$ are not required to be continuous and in sequential order. Several blocks of input and output data (collected over a 360° range of solar array angles) can be used to form the vector $\vec{Y}$ and the matrix $\vec{\Phi}$. Data taken during the initial excitation transient should not be included in the matrix $\vec{\Phi}$; the previous p excitation input signals must therefore be nonzero for each element $y[i]$ of $\vec{Y}$ ($u[i-1], \ldots, u[i-p] \neq 0$).

When identifying the periodic model parameters, corruption due to the measurement noise can be minimized by using large magnitude excitation input signals, including many samples in the vector $\vec{Y}$, and ensuring that the identified model order, p, is significantly larger than the true order of the plant.

The least squares estimate of the Fourier model coefficients, $\vec{\Theta}$, is computed by multiplying the pseudo inverse of the $\vec{\Phi}$ matrix by the vector of measured outputs $\vec{Y}$:

$$\vec{\Theta} = (\vec{\Phi}^T \vec{\Phi})^{-1} \vec{\Phi}^T \vec{Y}$$ (5)

The sequence of excitation input signals (e.g., the excitation torque commands 145 in FIG. 1 generated by an onboard random number generator) ensures that the matrix $\vec{\Theta}$ is well conditioned (all of the controllable and observable spacecraft system modes are excited and identifiable).

The Fourier model coefficients in the vector $\vec{\Theta}$ are stored, for example, as tables in the AVD controller gain update unit 160 on the spacecraft. Separate sets of numerator and denominator Fourier model coefficients are stored for the yaw, roll, and pitch axes.

Figure 3:
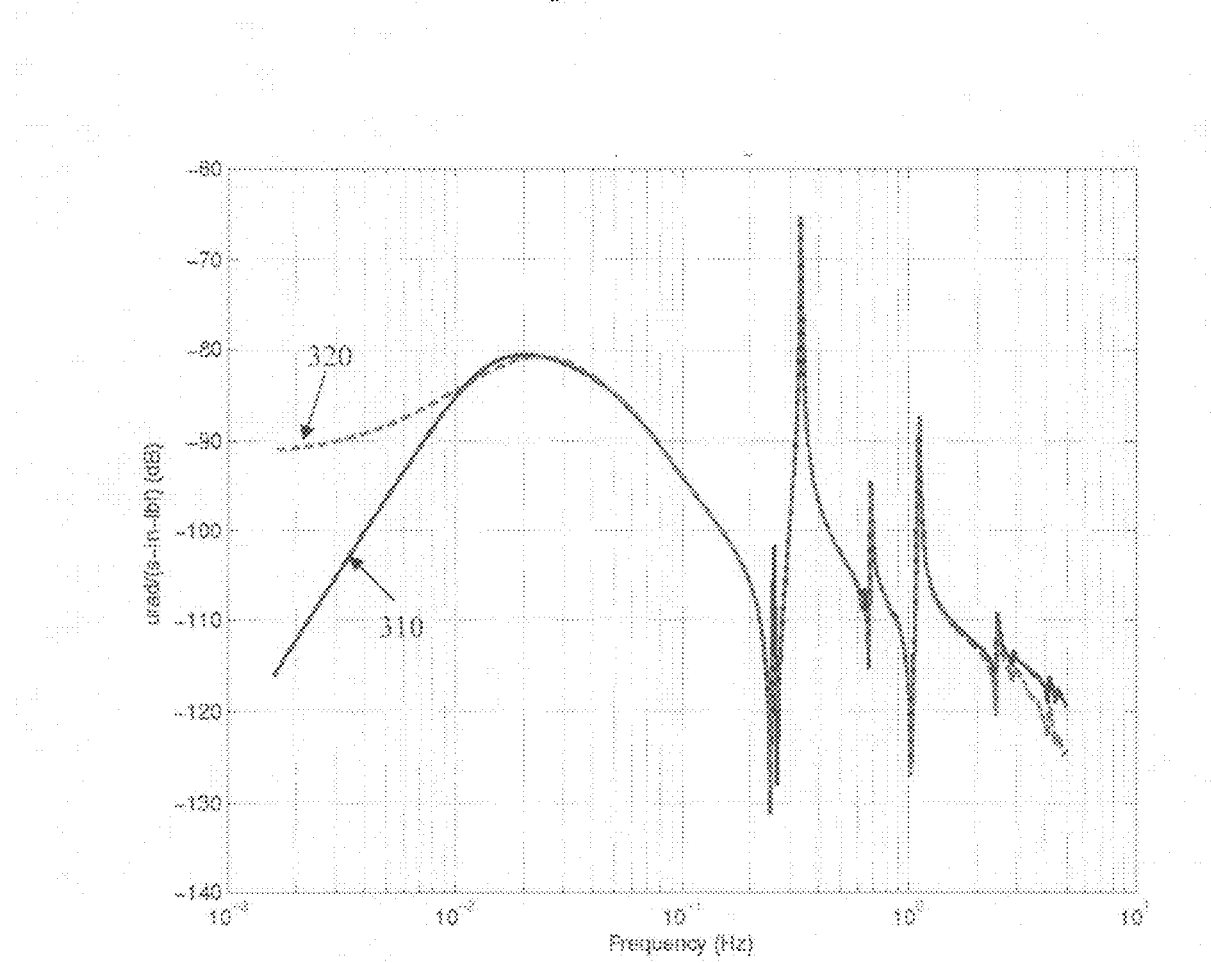
FIG. 3 illustrates the true and identified transfer functions for a geosynchronous remote sensing spacecraft according to one aspect of the present invention.

To illustrate the system identification processing, FIG. 3 shows the true and identified transfer functions from the roll axis excitation input signals to the roll axis AVD body rates for a geosynchronous remote sensing spacecraft according to one aspect of the present invention. A line 310 represents the true roll axis dynamics, and a line 320 represents the identified roll axis dynamics. Based on the identified model, an AVD control method is described in detail in the following section that attenuates the motion of the solar array bending modes and improves the jitter stability of the payload. FIG. 3 shows how the identified model correctly captures the dominant flexible modes (in particular the first out-of-plane solar array bending mode at 0.32 Hz). The identified model also captures the low frequency dynamics due to the low-bandwidth spacecraft attitude control system. The accurate low frequency dynamics identification allows the AVD controller to improve disturbance rejection at low frequencies.

AVD Damping Control

The AVD control system is designed to damp the dominant flexible modes of the spacecraft and improve rigid-body disturbance rejection performance. According to one embodiment of the present invention, a separate single-input, single-output controller is implemented for the yaw, roll, and pitch spacecraft axes. The AVD control method is derived from the identified periodic model parameters that are stored on the spacecraft (e.g., in the AVD controller gain update unit 160) once the system identification processing has been completed.

The AVD control system of the present invention implements a damping feedback control based on the identified periodic spacecraft dynamics model. At each time step, the controller equations are evaluated to determine the damping control torques that are applied to the RWAs or other actuators. Any number of controller formulations may be implemented for the AVD control system, such as linear quadratic regulator (LQR) or pole placement controller, or any other controller that can be formulated based on the identified periodic spacecraft dynamics model. A preferred approach for the AVD control system uses a predictive controller, which may be implemented as described in: Phan, M. Q. and Juang, J. N., "Predictive Controllers for Feedback Stabilization," *Journal of Guidance, Control, and Dynamics*, Vol. 21, No. 5, 1998, pp. 747-753.

Using this approach, the control can be expressed as a linear combination of past system outputs y(k) and control inputs u(k) as follows according to one aspect of the present invention:

$$u(k)=G_1 y(k-1)+G_2 y(k-2)+\ldots+G_p y(k-p)+H_1 u(k-1)+H_2 u(k-2)+\ldots+H_p u(k-p) \quad (6)$$

Where p is the order of the identified spacecraft dynamics model, and $G_i$ and $H_i$ are the controller parameters (e.g., the control gains 165 in FIG. 1), which may be computed as:

$$G_1 = [g_1, g_2, \ldots, g_p]\begin{bmatrix} a_1 \\ a_2 \\ \vdots \\ a_p \end{bmatrix}, \quad (7a)$$

$$G_2 = [g_1, g_2, \ldots, g_{p-1}]\begin{bmatrix} a_2 \\ a_3 \\ \vdots \\ a_p \end{bmatrix}, \ldots, G_p = g_1 a_p$$

$$H_1 = [g_1, g_2, \ldots, g_p]\begin{bmatrix} b_1 \\ b_2 \\ \vdots \\ b_p \end{bmatrix}, \quad (7b)$$

$$H_2 = [g_1, g_2, \ldots, g_{p-1}]\begin{bmatrix} b_2 \\ b_3 \\ \vdots \\ b_p \end{bmatrix}, \ldots, H_p = g_1 b_p$$

Where $a_i$ and $b_i$ are the coefficients of the identified spacecraft ARX dynamics model and the $g_i$ values are the elements of the first r-row partition of the matrix given below (note that r is the number of inputs for each ARX model—r=1 for a typical spacecraft AVD application):

$$M=-[A_p^{q-1}B_p, \ldots, A_p B_p B_p]^+ A_p^q \quad (8)$$

In the above expression q is the prediction horizon, or the number of time steps over which the system state is driven to zero and + denotes the matrix pseudo inverse. The state-space model matrices $A_p$ and $B_p$ may be constructed from the identified ARX model coefficients according to the standard observable canonical form $$A_p = \begin{bmatrix} a_1 & I & 0 & \ldots & 0 \\ a_2 & 0 & I & \ddots & \vdots \\ a_3 & 0 & 0 & \ddots & 0 \\ \vdots & \vdots & \vdots & \ddots & I \\ a_p & 0 & 0 & \ldots & 0 \end{bmatrix} \quad B_p = \begin{bmatrix} b_1 \\ b_2 \\ b_3 \\ \vdots \\ b_p \end{bmatrix} \quad (9)$$

It should be noted that variants of the predictive controller are possible where, rather than driving the state precisely to zero, the state is reduced to a some fraction of its current value over a specified q-step prediction horizon. According to one aspect of the present invention, Equation 6 described above is implemented in the AVD control logic unit 170 of FIG. 1.

Figures 4A, 4B, 4C:
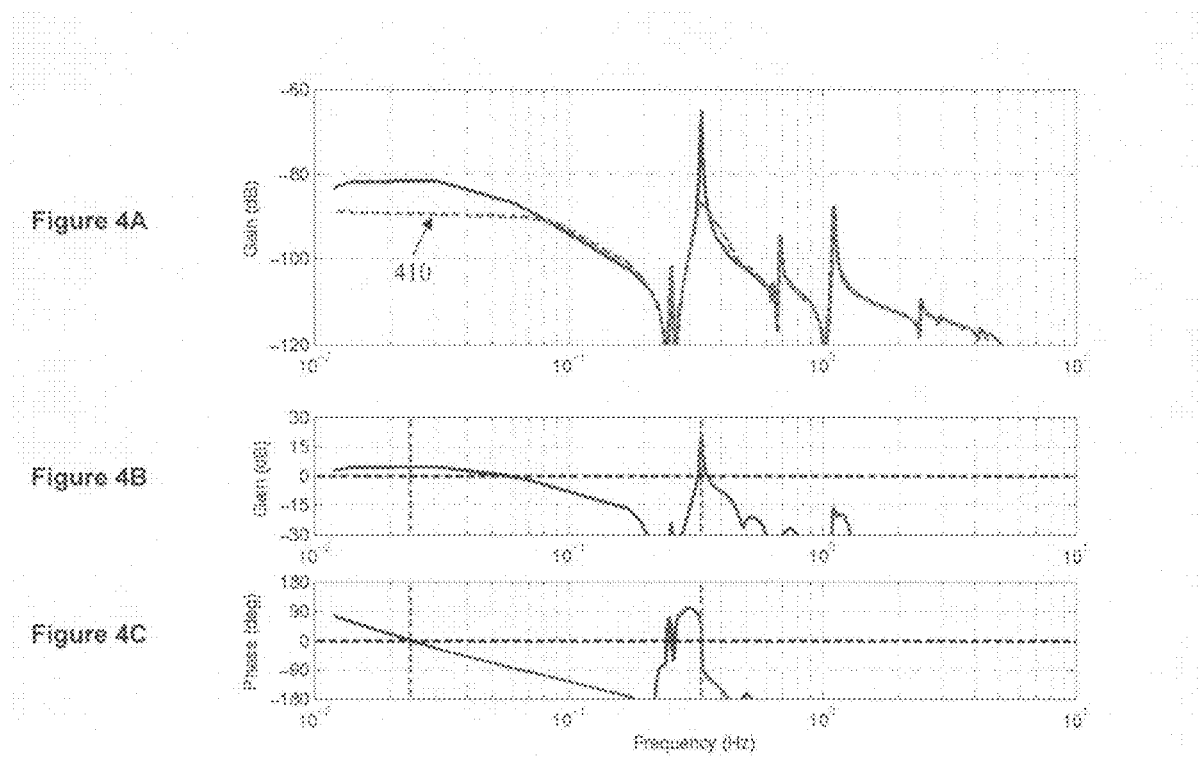
FIGS. 4A-4C illustrates how the AVD control damps the most dominant flexible modes of a spacecraft at a particular solar array angle according to one aspect of the present invention.

The benefits of the AVD control system for the identified remote sensing satellite dynamics in FIG. 3 are illustrated by the closed loop transfer function of FIG. 4A according to one aspect of the present invention. A line 410 shows how the AVD controller has improved the disturbance rejection from the roll axis excitation input signals to the roll axis body rates at low frequency and significantly attenuated the flexible solar array mode at 0.32 Hz.

FIGS. 4A-4C show how the AVD control system damps the most dominant flexible modes at a particular solar array angle according to one aspect of the present invention. Damping is achieved by adding gain to the open-loop transfer function at the frequency of the flexible modes. At the same time, the phase of the open-loop transfer function is compensated to 0° at the flexible mode frequency to provide approximately +90° of phase margin at the 0 dB crossings. Similar robustness is also achieved at low frequency as shown in FIGS. 4A-4C.

Figure 5:
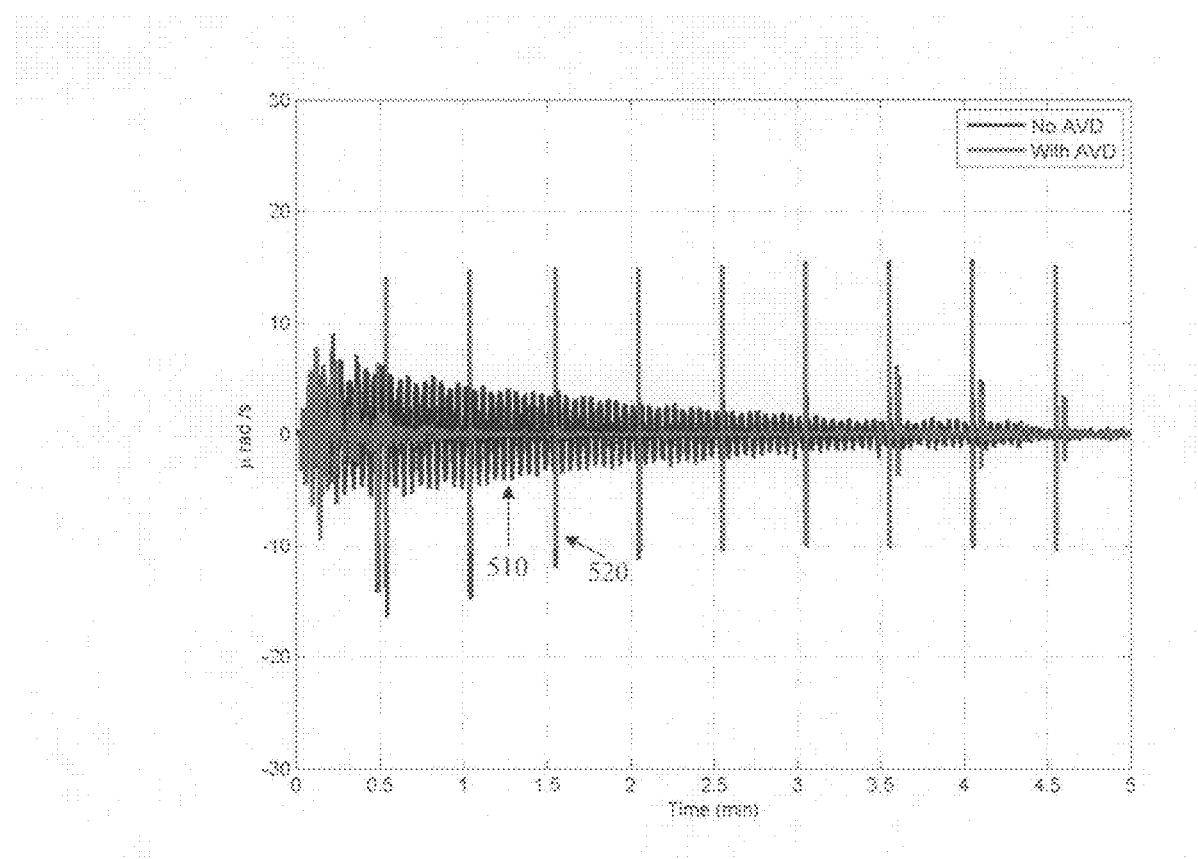
FIG. 5 illustrates the effect of the AVD control system on a remote sensing spacecraft payload according to one aspect of the present invention.

The effect of the AVD control system on the remote sensing spacecraft payload is shown in FIG. 5 according to one aspect of the present invention. A line 510 shows the roll attitude rate response of the payload in response to disturbances generated by the instrument scanning mirror. A line 520 shows the effect of the increased damping with the AVD control system. The rate response is attenuated within one minute as opposed to ringing down for almost five minutes without the AVD control. The simulation results described above show that the AVD control system is a significant discriminator, enabling instrument stability requirements to be met.

According to one aspect of the present invention, the AVD control system requires no ground based modeling or controller design. No a-priori models are used. A flexible mode damping control is applied using a predictive controller and an in-orbit identified periodic model of the spacecraft attitude dynamics. Analysis has shown that the AVD control system of the present invention is highly robust, and provides a flexible mode phase margin of +/−90 degrees.

In one aspect, the step of generating an excitation input signal comprises the step of generating the excitation input signal while the spacecraft is not in operation, wherein the step of applying a force based on the excitation input signal to the spacecraft comprises the step of applying the force to the spacecraft while the spacecraft is not in operation, wherein the step of receiving system identification data comprising the excitation input signal and first information associated with motion of the spacecraft comprises the step of receiving the system identification data while the spacecraft is not in operation, wherein the step of obtaining second information associated with motion of the spacecraft comprises the step of obtaining the second information while the spacecraft is in operation, wherein the step of generating a damping signal based on the control model parameters and the second information comprises the step of generating the damping signal while the spacecraft is in operation, wherein the step of generating a damping force based on the damping signal comprises the step of generating the damping force while the spacecraft is in operation, wherein the step of applying the damping force to the spacecraft to damp vibration comprises the step of applying the damping force to the spacecraft while the spacecraft is in operation, and wherein the spacecraft that is not in operation comprises at least one of: a spacecraft during a pre-operational in-orbit testing period, and a spacecraft that is off-line.

The description of the invention is provided to enable any person skilled in the art to practice the various embodiments described herein. While the present invention has been particularly described with reference to the various figures and embodiments, it should be understood that these are for illustration purposes only and should not be taken as limiting the scope of the invention.

There may be many other ways to implement the invention. For example, the present invention may be formulated using a spacecraft dynamics model or controller model expressed in the solar array frame, rather than in the spacecraft body frame. Various functions and elements described herein may be partitioned differently from those shown without departing from the spirit and scope of the invention. Various modifications to these embodiments will be readily apparent to those skilled in the art, and generic principles defined herein may be applied to other embodiments. Thus, many changes and modifications may be made to the invention, by one having ordinary skill in the art, without departing from the spirit and scope of the invention.

A reference to an element in the singular is not intended to mean "one and only one" unless specifically stated, but rather "one or more." The term "some" refers to one or more. Underlined and/or italicized headings and subheadings are used for convenience only, do not limit the invention, and are not referred to in connection with the interpretation of the description of the invention. All structural and functional equivalents to the elements of the various embodiments described throughout this disclosure that are known or later come to be known to those of ordinary skill in the art are expressly incorporated herein by reference and intended to be encompassed by the invention. Moreover, nothing disclosed herein is intended to be dedicated to the public regardless of whether such disclosure is explicitly recited in the above description.

What is claimed is:

1. A method for actively damping vibration generated on a spacecraft, the method comprising:
generating an excitation input signal;
applying a force based on the excitation input signal to the spacecraft;
receiving system identification data comprising the excitation input signal and first information associated with motion of the spacecraft;
generating control model parameters based on the system identification data;
obtaining second information associated with motion of the spacecraft;
generating a damping signal based on the control model parameters and the second information;
generating a damping force based on the damping signal; and
applying the damping force to the spacecraft to damp vibration.

2. The method according to claim 1, wherein the system identification data further comprises solar array angles, and the first information associated with motion of the spacecraft comprises body rates of the spacecraft.

3. The method according to claim 1 further comprising:
after the step of generating an excitation input signal, sensing information associated with motion of the spacecraft while the spacecraft is not in operation;
prior to generating control model parameters, obtaining solar array angles while the spacecraft is not in operation;
after the step of generating control model parameters, storing the control model parameters; and
prior to generating a damping signal, providing control gains, wherein the spacecraft that is not in operation comprises at least one of: a spacecraft during a pre-operational in-orbit testing period, and a spacecraft that is off-line.

4. The method according to claim 1 further comprising:
after the step of generating an excitation input signal, sensing information associated with motion of the spacecraft while the spacecraft is not in operation;
converting the sensed information to body rates; and
collecting the body rates,
wherein the first information associated with motion of the spacecraft comprises the body rates, and
wherein the spacecraft that is not in operation comprises at least one of: a spacecraft during a pre-operational in-orbit testing period, and a spacecraft that is off-line.

5. The method according to claim 1 further comprising:
after the step of generating control model parameters, obtaining a solar array angle,
wherein the step of generating a damping signal comprises generating the damping signal while the spacecraft is in operation based on the control model parameters, the second information, and the solar array angle.

6. The method according to claim 1 further comprising:
generating actuator torque commands based on the damping signal, wherein the damping signal comprises active vibration damping (AVD) control torque commands.

7. The method according to claim 1, wherein the step of generating an excitation input signal comprises generating the excitation input signal using a random number generator, and the excitation input signal comprises a pseudo random sequence.

8. The method according to claim 1, wherein the force comprises torques, and the damping force comprises torques.

9. The method according to claim 1, wherein the control model parameters are periodic with respect to solar array angles.

10. The method according to claim 1, wherein the control model parameters are based on one or more dynamics of the excitation input signal, the spacecraft, sensors, actuators, low-bandwidth spacecraft attitude control, time delays, and proportional-integral-derivative (PID) control.

11. The method according to claim 1, wherein the damping signal is for damping dominant flexible modes of the spacecraft.

12. The method according to claim 1 further comprising adding gain to a transfer function at a frequency of flexible modes of the spacecraft.

13. The method according to claim 1 further comprising compensating a phase of a transfer function to zero degree) (0°) at a frequency of flexible modes of the spacecraft.

14. The method according to claim 1, wherein the method is performed on-board the spacecraft.

15. The method according to claim 1, wherein the step of generating an excitation input signal comprises the step of generating the excitation input signal while the spacecraft is not in operation,
wherein the step of applying a force based on the excitation input signal to the spacecraft comprises the step of applying the force to the spacecraft while the spacecraft is not in operation,
wherein the step of receiving system identification data comprising the excitation input signal and first information associated with motion of the spacecraft comprises the step of receiving the system identification data while the spacecraft is not in operation,
wherein the step of obtaining second information associated with motion of the spacecraft comprises the step of obtaining the second information while the spacecraft is in operation,
wherein the step of generating a damping signal based on the control model parameters and the second information comprises the step of generating the damping signal while the spacecraft is in operation,
wherein the step of generating a damping force based on the damping signal comprises the step of generating the damping force while the spacecraft is in operation, and wherein the step of applying the damping force to the spacecraft to damp vibration comprises the step of applying the damping force to the spacecraft while the spacecraft is in operation, and wherein the spacecraft that is not in operation comprises at least one of: a spacecraft during a pre-operational in-orbit testing period, and a spacecraft that is off-line.

* * * * *

UNITED STATES PATENT AND TRADEMARK OFFICE
CERTIFICATE OF CORRECTION

PATENT NO. : 7,917,256 B2
APPLICATION NO. : 11/797251
DATED : March 29, 2011
INVENTOR(S) : Neil E. Goodzeit et al.

It is certified that error appears in the above-identified patent and that said Letters Patent is hereby corrected as shown below:

In Column 6, Lines 56-57: Replace
"$(B_{p0} + B_{p1}sin(2\theta_k) + B_{p2}cos(2\theta_k) + B_{p3}sin(4\theta_k) + B_{p1}cos(4\theta_k))u[k-p]$", with
-- $(B_{p0} + B_{p1}sin(2\theta_k) + B_{p2}cos(2\theta_k) + B_{p3}sin(4\theta_k) + B_{p4}cos(4\theta_k))u[k-p]$ --

In Column 10, Line 10: Replace "approximately +90°", with -- approximately ±90° --

Signed and Sealed this
Fourth Day of October, 2011

David J. Kappos
*Director of the United States Patent and Trademark Office*